(12) United States Patent
Kim et al.

(10) Patent No.: US 12,325,356 B1
(45) Date of Patent: Jun. 10, 2025

(54) INJECTION BRACKET DEVICE APPLIED TO ROOF OPENING FOR VEHICLE

(71) Applicants: HYUNDAI MOTOR COMPANY, Seoul (KR); KIA CORPORATION, Seoul (KR); NVH KOREA, INC., Ulsan (KR)

(72) Inventors: Min Su Kim, Hwaseong-si (KR); Won Jong Lee, Suwon-si (KR); Byung Yong Choi, Hwaseong-si (KR); Tae Oh Moon, Incheon (KR); Won Young Na, Seongnam-si (KR); Jae Hoon Jung, Hwaseong-si (KR); Ha Ryung Park, Osan-si (KR); Hyeong Ju Kim, Suwon-si (KR)

(73) Assignees: HYUNDAI MOTOR COMPANY, Seoul (KR); KIA CORPORATION, Seoul (KR); NVH KOREA, INC., Ulsan (KR)

( * ) Notice: Subject to any disclaimer, the term of this patent is extended or adjusted under 35 U.S.C. 154(b) by 0 days.

(21) Appl. No.: 18/827,443

(22) Filed: Sep. 6, 2024

(30) Foreign Application Priority Data

Mar. 4, 2024 (KR) ........................ 10-2024-0030634

(51) Int. Cl.
*B60Q 3/208* (2017.01)
*B60Q 3/51* (2017.01)
*B60Q 3/54* (2017.01)

(52) U.S. Cl.
CPC ............... *B60Q 3/208* (2017.02); *B60Q 3/51* (2017.02); *B60Q 3/54* (2017.02)

(58) Field of Classification Search
CPC ............. B60Q 3/208; B60Q 3/51; B60Q 3/54
USPC ........................................................ 362/490
See application file for complete search history.

(56) References Cited

U.S. PATENT DOCUMENTS

| 10,272,832 B2 | 4/2019 | Xu et al. |
| 10,625,668 B2 * | 4/2020 | Oshina ..................... B60Q 3/64 |
| 11,203,255 B2 | 12/2021 | Hiemstra et al. |

FOREIGN PATENT DOCUMENTS

| JP | 5387385 B2 | 1/2014 |
| KR | 102192154 B1 | 12/2020 |

* cited by examiner

*Primary Examiner* — Laura K Tso
(74) *Attorney, Agent, or Firm* — MCDONNELL BOEHNEN HULBERT & BERGHOFF LLP (57) ABSTRACT

Disclosed is an injection bracket device applied to a roof opening for a vehicle, the injection bracket device including an opening bracket mounted to an opening formed in a headlining of the vehicle, and a mounting guide provided along the edge of the opening bracket, wherein the mounting guide forms a seating area when being coupled to the opening bracket.

14 Claims, 10 Drawing Sheets

INJECTION BRACKET DEVICE APPLIED TO ROOF OPENING FOR VEHICLE

CROSS-REFERENCE TO RELATED APPLICATION

This application claims, under 35 U.S.C. § 119 (a), the benefit of and priority to Korean Patent Application No. 10-2024-0030634, filed on Mar. 4, 2024, the entire contents of which are incorporated herein by reference.

TECHNICAL FIELD

The present disclosure relates to an injection bracket device applied to a roof opening for a vehicle. More particularly, it relates to an injection bracket device applied to a roof opening for a vehicle capable of mounting a lighting system within a roof to allow the lighting system to respond to various indoor and outdoor situations.

BACKGROUND

Generally, a vehicle sunroof is installed in a vehicle to provide ventilation inside the vehicle when smoking or traveling long distances, as well as to overcome the narrowness of the interior space and secure a sense of openness.

A sunroof typically includes a glass panel slidably mounted to open and close the opening formed in a vehicle roof panel, and the sunroof is configured to open or close the opening by tilting the glass panel or by linearly moving the glass panel in a front-rear direction.

Recently, a panoramic sunroof in which the roof panel thereof has a full glass structure has become a preferred feature among customers, becoming a trend.

The panoramic sunroof has an improved sense of openness compared to a conventional sunroof, providing a more comfortable ride for drivers and passengers during daytime travelling. However, when travelling at night or in rainy or snowy weather, the panoramic sunroof may not be as effective, because the outside environment is not visible.

For this reason, there is a recent trend to install ambient lighting to provide a driver with a comfortable ride not only during daytime travelling, but also during nighttime travelling, and said problem may be solved if a lighting module is provided by installing the ambient lighting around the sunroof glass.

The above information disclosed in this Background section is only for enhancement of understanding of the background of the present disclosure, and therefore it may contain information that does not form the prior art that is already known to a person of ordinary skill in the art.

SUMMARY

The present disclosure has been made in an effort to address the above-described problems associated with the prior art, and an object of the present disclosure is to provide an injection bracket device applied to a roof opening for a vehicle having a structure in which an opening bracket including a mounting guide is injection molded to mount a lighting module along the edge of a headliner opening, allowing lights to be uniformly radiated in all directions of a sunroof including corners, and setting the radiation length and radiation pattern of the light by modifying the structure of the opening bracket, thereby securing a degree of freedom regarding the radiation of lights.

In one aspect, the present disclosure provides an injection bracket device applied to a roof opening for a vehicle, the injection bracket device including an opening bracket mounted to an opening formed in a headlining of the vehicle, and a mounting guide provided along the edge of the opening bracket. Here, the mounting guide may form a seating area when coupled to the opening bracket.

In a embodiment, the injection bracket device may further include a lighting module placed on the seating area.

In another embodiment, the mounting guide may be integrally injected to be deployed outward from the edge of the opening bracket.

In still another embodiment, the mounting guide may be divided into plural portions and constitute one body.

In yet another embodiment, the opening bracket may include a body portion provided to be brought into contact with the inner side of the headlining, and a radiation path forming portion, forming the seating area together with the mounting guide on the body portion and configured to set a radiation path of the lighting module.

In still yet another embodiment, the radiation path forming portion may be injected to protrude to be stepped with respect to the headlining to thereby adjust a length of the radiation path.

In a further embodiment, the radiation path forming portion may be injected to be stepped with respect to the headlining and alternately protrude in the length direction of the body portion to thereby form a pattern of the radiation path.

In yet another embodiment, the mounting guide may include a mounting portion configured to rotate inward from a state deployed from the opening bracket, a locking portion to be placed to be locked in a locking groove in a protruding member provided on the opening bracket, as the mounting portion rotates, and a seating portion to form the seating area while supporting the lighting module placed on the protruding member, as the mounting portion rotates.

In still further embodiment, the mounting portion may have applied thereto a notch structure configured to allow the mounting portion to rotate about one end portion extending from the protruding member.

In yet another embodiment, the seating portion may be rounded to correspond to the shape of the lighting module.

In still yet another embodiment, the injection bracket device may further include a shock-absorbing member inserted to be integrally mounted in a plurality of mounting areas formed on the opening bracket.

In a still embodiment, the injection bracket device may further include a position-fixation member integrally injection molded on the opening bracket to fix a sunroof system in place in the opening.

In still another embodiment, the position-fixation member may have a shape corresponding to that of a plurality of coupling protrusions attached to the sunroof system to thereby be inserted and locked crosswise between the coupling protrusions.

In a yet still embodiment, the position-fixation member may protrude in a wedge shape to thereby be inserted and locked in a plurality of coupling holes formed in the sunroof system.

Other aspects and preferred embodiments of the present disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Hereinafter, preferred embodiments according to the present disclosure will be described in detail with reference to the accompanying drawings.

Advantages and features of the present disclosure, and a method of achieving the same, will be apparent with reference to the embodiments described below in detail in conjunction with the accompanying drawings.

However, the present disclosure may be embodied in many different forms, and should not be construed as being limited to the embodiments set forth herein. Rather, the embodiments are provided so that the present disclosure will be thorough and complete, and will fully convey the scope of the present disclosure to those skilled in the art. The present disclosure is defined only by the categories of the claims.

In describing the present disclosure, if a detailed explanation of a related known function or construction is considered to unnecessarily obscure the gist of the present disclosure, such explanation has been omitted but would be understood by those skilled in the art.

Figure 1:
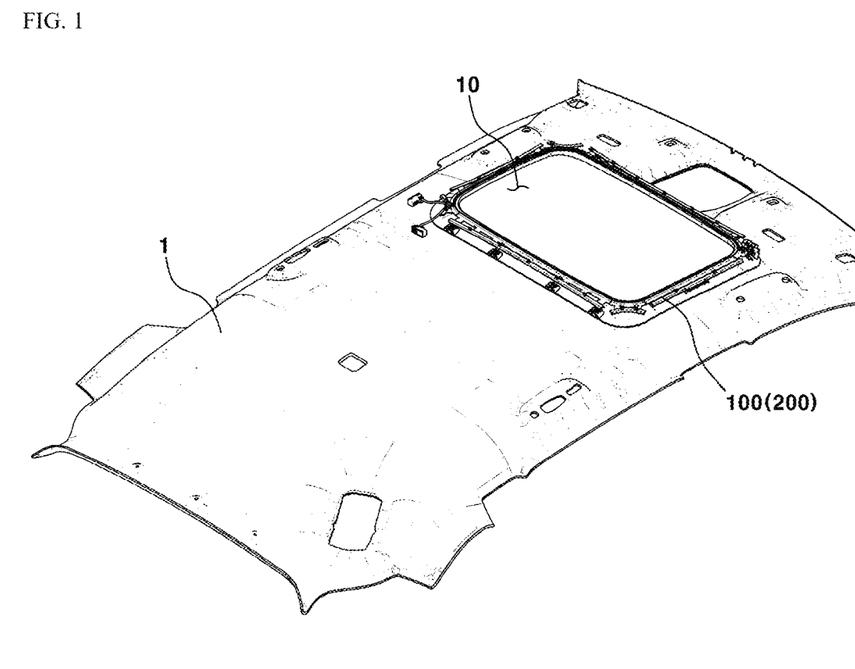
FIG. 1 is a view illustrating an injection bracket device applied to a roof opening for a vehicle according to an embodiment of the present disclosure.
Figure 2:
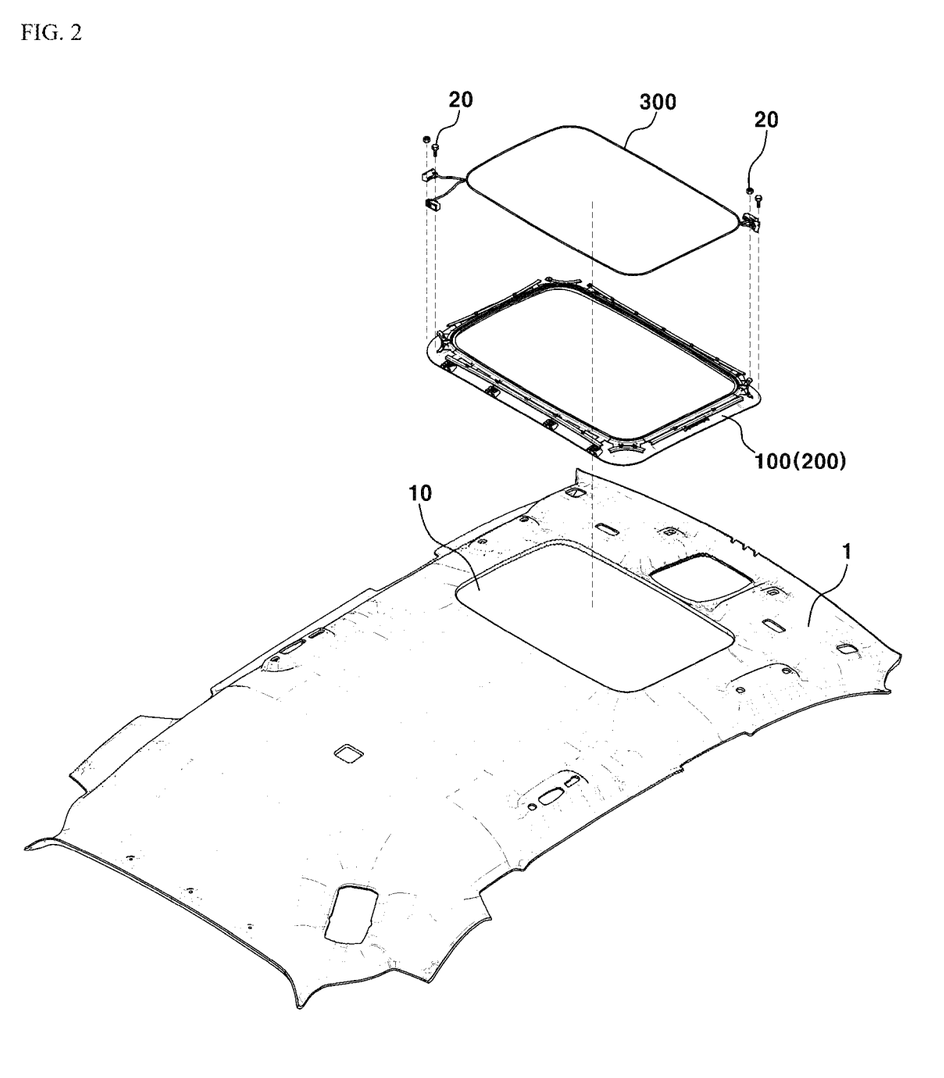
FIG. 2 is an exploded perspective view of an injection bracket device applied to a roof opening for a vehicle according to an embodiment of the present disclosure.

FIG. 1 is a view illustrating an injection bracket device applied to a roof opening for a vehicle according to an embodiment of the present disclosure, and FIG. 2 is an exploded perspective view of an injection bracket device applied to a roof opening for a vehicle according to an embodiment of the present disclosure.

Figure 3:
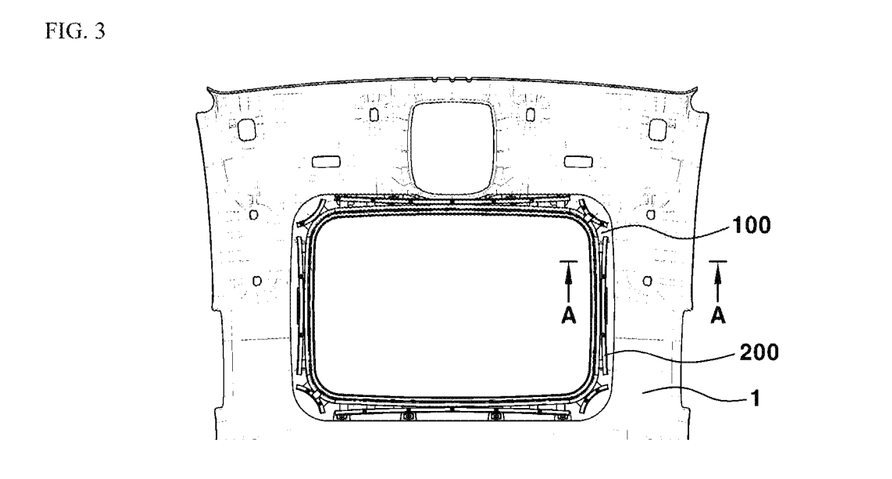
FIG. 3 is an assembled perspective view of an injection bracket device applied to a roof opening for a vehicle according to an embodiment of the present disclosure.
Figure 4:
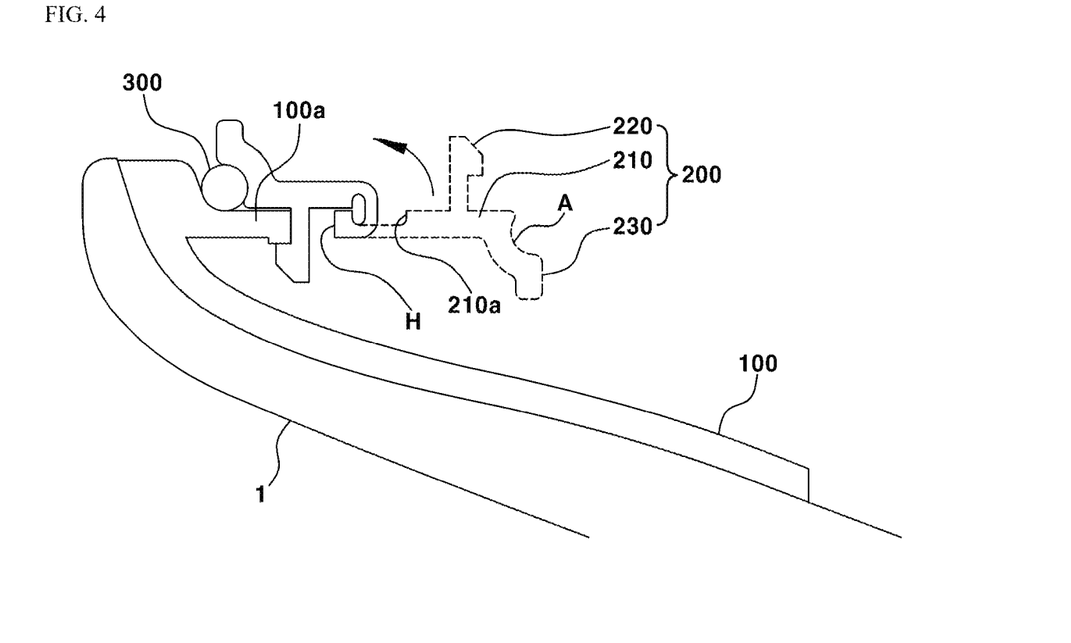
FIG. 4 is a cross-sectional view taken along line A-A of FIG. 3, illustrating a mounting guide for an injection bracket device applied to a roof opening for a vehicle according to an embodiment of the present disclosure.

FIG. 3 is an assembled perspective view of an injection bracket device applied to a roof opening for a vehicle according to an embodiment of the present disclosure, and FIG. 4 is a cross-sectional view taken along line A-A of FIG. 3, illustrating a mounting guide for an injection bracket device applied to a roof opening for a vehicle according to an embodiment of the present disclosure.

Figure 10:
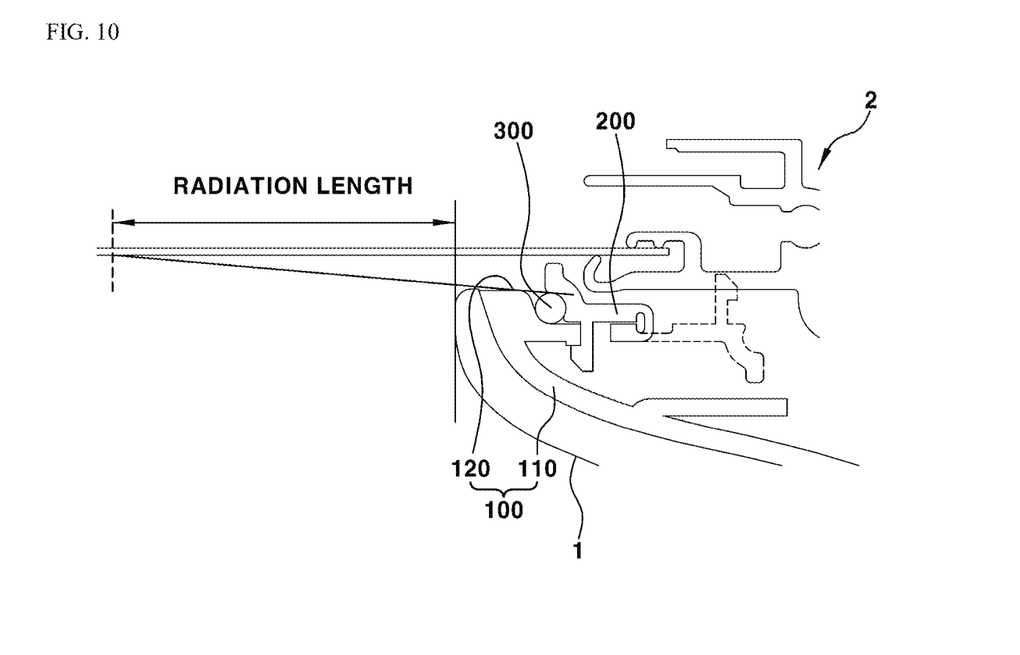
FIG. 10 is a view showing the radiation length and radiation pattern for an injection bracket device applied to a roof opening for a vehicle according to an embodiment of the present disclosure.
Figure 11A:
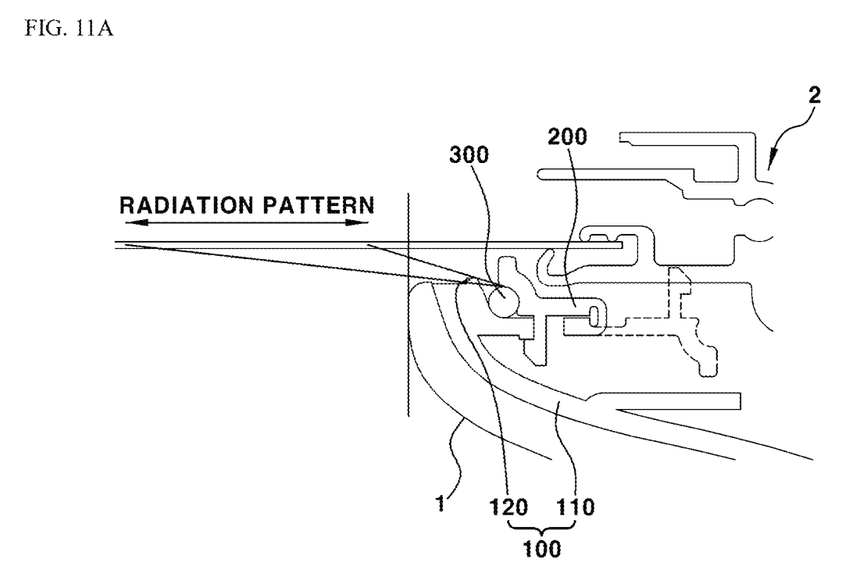
FIG. 11A is a view showing the radiation length and radiation pattern for an injection bracket device applied to a roof opening for a vehicle according to an embodiment of the present disclosure.
Figure 11B:
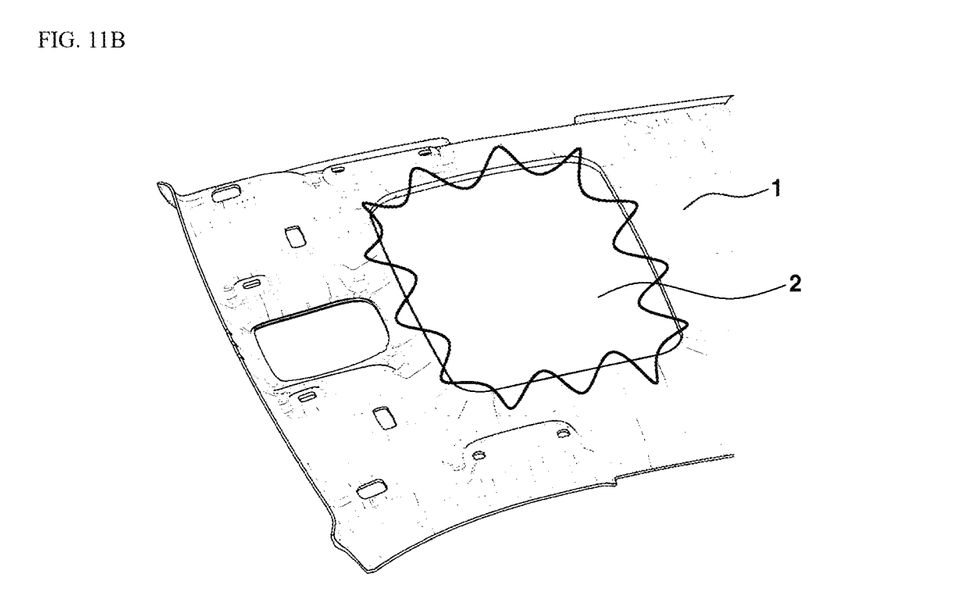
FIG. 11B is a view showing the radiation length and radiation pattern for an injection bracket device applied to a roof opening for a vehicle according to an embodiment of the present disclosure.
Figure 12:
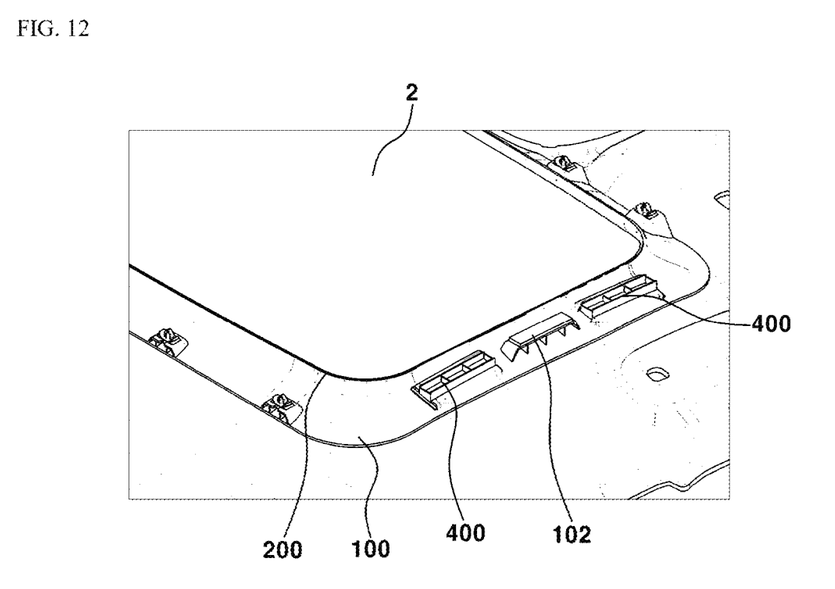
FIG. 12 is a view illustrating a shock-absorbing member for an injection bracket device applied to a roof opening for a vehicle according to an embodiment of the present disclosure.
Figure 13:
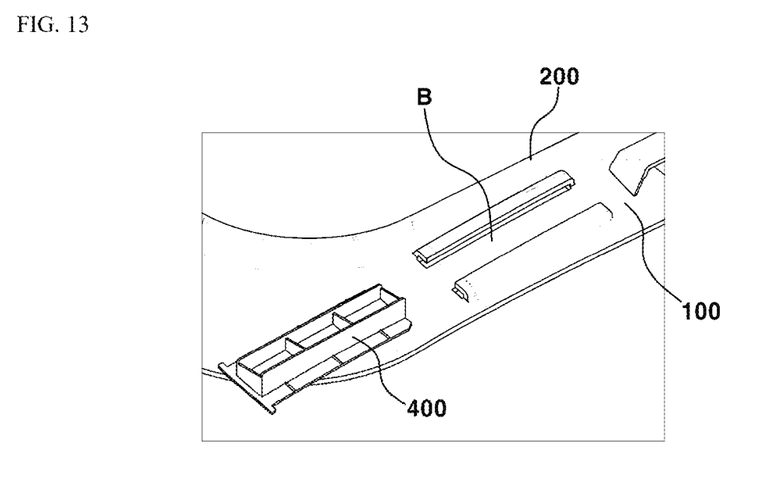
FIG. 13 is a view illustrating a shock-absorbing member for an injection bracket device applied to a roof opening for a vehicle according to an embodiment of the present disclosure.

FIG. 5 through FIG. 8 are views sequentially illustrating the fastening among a plurality of components for an injection bracket device applied to a roof opening for a vehicle according to an embodiment of the present disclosure, FIG. 9 through FIG. 11A, and FIG. 11B are views showing the radiation length and radiation pattern for an injection bracket device applied to a roof opening for a vehicle according to an embodiment of the present disclosure, and FIG. 12 and FIG. 13 are views illustrating a shock-absorbing member for an injection bracket device applied to a roof opening for a vehicle according to an embodiment of the present disclosure.

Figure 14:
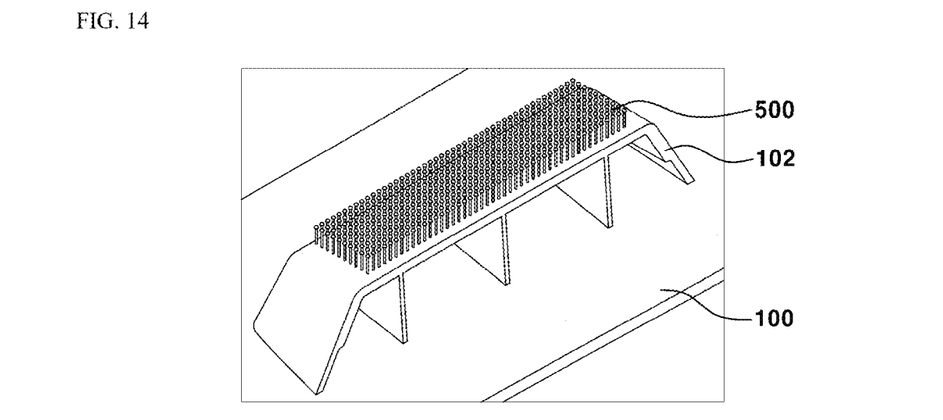
FIG. 14 is a view illustrating a first embodiment of a position-fixation member for an injection bracket device applied to a roof opening for a vehicle according to an embodiment of the present disclosure.
Figure 15:
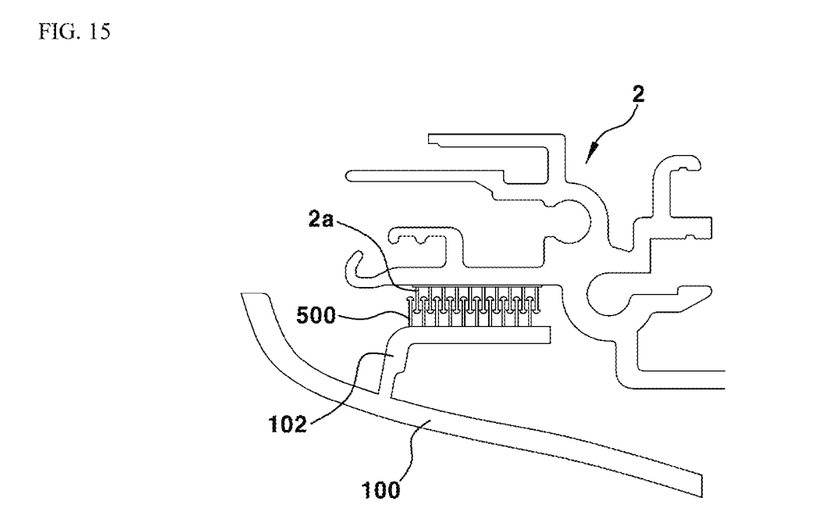
FIG. 15 is a view illustrating a first embodiment of a position-fixation member for an injection bracket device applied to a roof opening for a vehicle according to an embodiment of the present disclosure.
Figure 16:
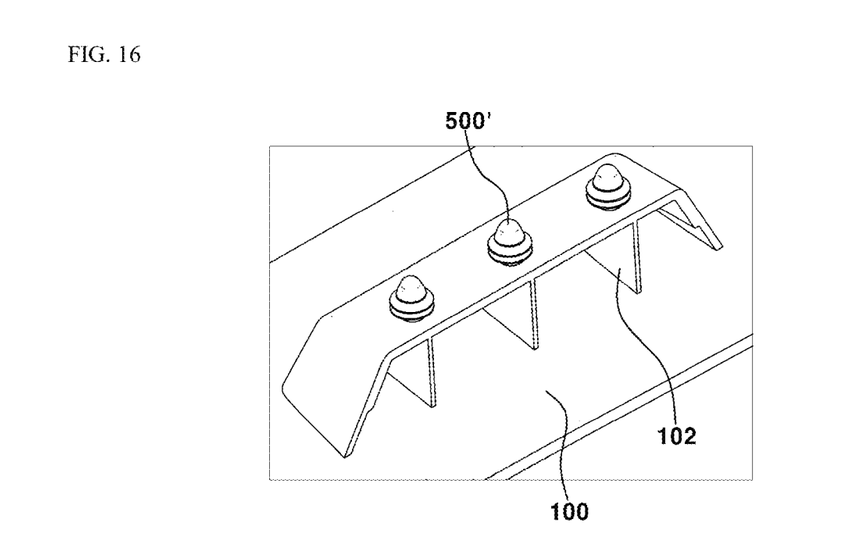
FIG. 16 is a view illustrating a second embodiment of a position-fixation member for an injection bracket device applied to a roof opening for a vehicle according to an embodiment of the present disclosure.
Figure 17:
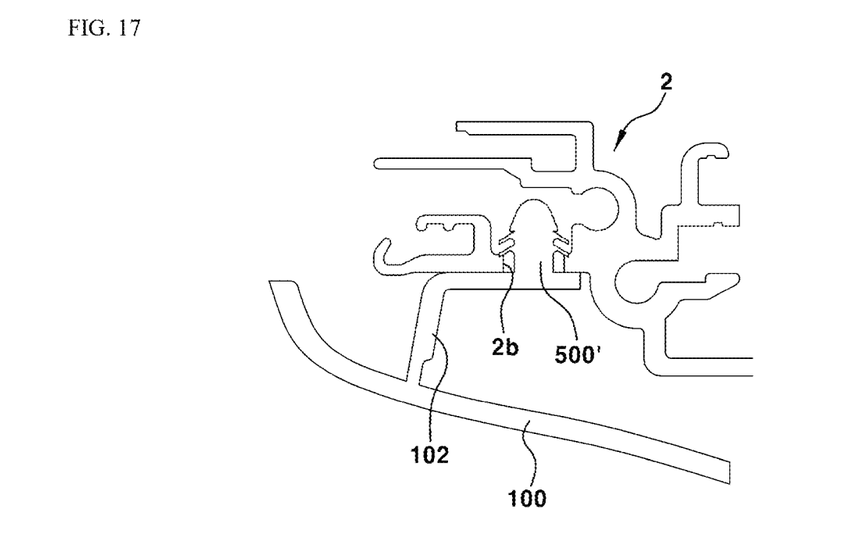
FIG. 17 is a view illustrating a second embodiment of a position-fixation member for an injection bracket device applied to a roof opening for a vehicle according to an embodiment of the present disclosure.

FIG. 14 and FIG. 15 are views illustrating a first embodiment of a position-fixation member for an injection bracket device applied to a roof opening for a vehicle according to an embodiment of the present disclosure, and FIG. 16 and FIG. 17 are views illustrating a second embodiment of a position-fixation member for an injection bracket device applied to a roof opening for a vehicle according to an embodiment of the present disclosure.

The sunroof opening bracket mounted to the headlining of the prior art is made of steel, which has the advantage of rigidity, but due to the nature of the steel material, it is hard to modify the structure thereof, rendering it difficult to implement various applications.

Particularly, there has been a recent trend of increasing demand for application of a mood lamp in a vehicle interior. However, when an opening bracket is made of steel, it is difficult to modify the structure, so it is not possible to install a lighting structure for applying a mood lamp.

Moreover, even if the lighting structure is installed, installation of the lighting structure to the front and rear is not allowed because forward and rearward are directions of operation of the sunroof system, and so as to avoid interference with the sunroof system, the lighting structure can only be installed to radiate lights to the sides, limiting the application of the mood lamp.

In order to overcome the limitation, an injection bracket device applied to a roof opening for a vehicle according to this embodiment includes, as illustrated in FIG. 1 and FIG. 2, an opening bracket 100, a mounting guide 200, and a lighting module 300.

The opening bracket 100 is disposed in an opening 10 formed in a headlining 1, and is fastened to the headlining 1 using separate fastening members 20.

Because the opening bracket 100 is injection molded, the structure thereof may be modified, and the opening bracket 100 may be lighter and reduce costs compared to the opening bracket of the prior art made of a steel material.

When injection molding the opening bracket 100, the mounting guide 200 is, as illustrated in FIG. 3 and FIG. 4, injected together therewith by following the edge of the opening bracket 100 protruding outward (here, the edge is a protruding member 100a).

More specifically, the mounting guide 200 is, as illustrated in the dotted line in FIG. 4, integrally injected to the opening bracket 100 so as to be deployed from the protruding member 100a of the opening bracket 100.

Figure 5:
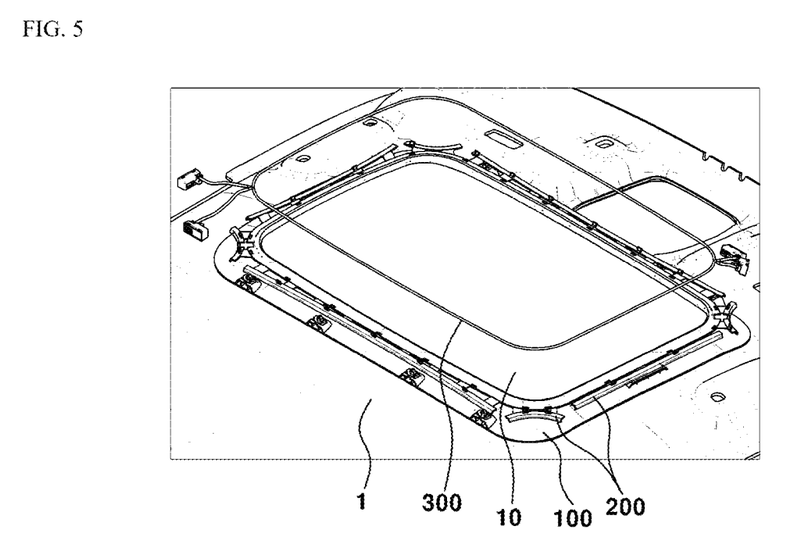
FIG. 5 through FIG. 8 are views sequentially illustrating the fastening among a plurality of components for an injection bracket device applied to a roof opening for a vehicle according to an embodiment of the present disclosure.

Here, as illustrated in FIG. 5, the mounting guide 200 is integrated with the opening bracket 100 by being divided into forward and rearward portions (forward and rearward are directions of operation of a sunroof system 2), opposite side portions, and rounded corner portions.

Figure 7:
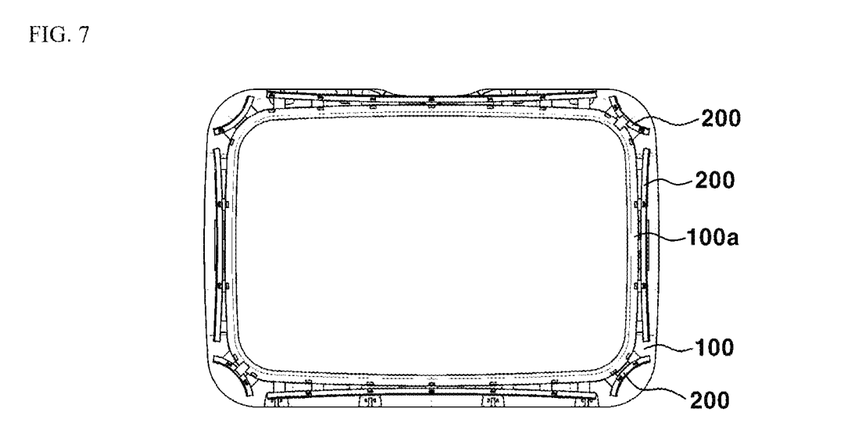

The mounting guide 200 has the structure because, as illustrated in FIG. 7, the mounting guide 200 in the state of being deployed outward from the protruding member 100a rotates inward to be coupled to the opening bracket 100 to form a seating area A, and if the mounting guide 200 is provided as one piece, the rounded corners of the mounting guide 200 would make it difficult to rotate to be coupled.

Therefore, when injection molding the mounting guide 200 having a structure in which the mounting guide 200 is deployed from the protruding member 100a of the opening bracket 100, the mounting guide 200 is divided into forward and rearward portions (forward and rearward are directions of operation of the sunroof system 2), opposite side portions, and corner portions, facilitating each portion to be coupled to the opening bracket 100 by rotation, and stably fixing the lighting module 300.

The mounting guide 200 includes, as illustrated in FIG. 4, a mounting portion 210, a locking portion 220, and a seating portion 230.

Figure 6:
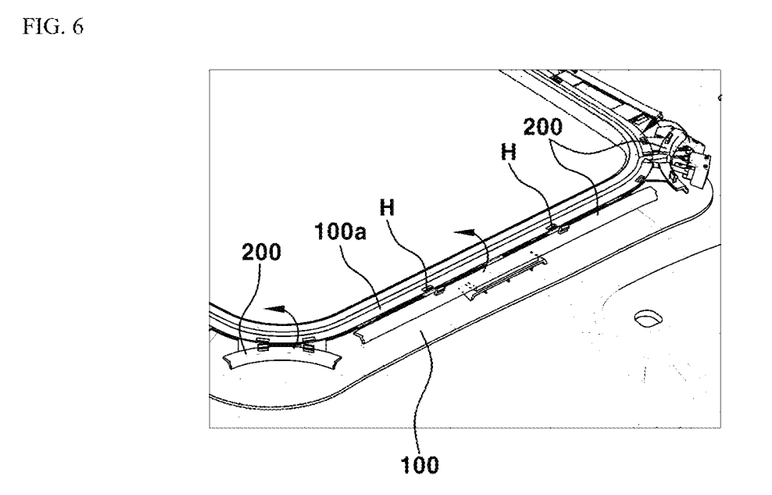

The mounting portion 210 rotates inward to surround the protruding member 100a from a state of being deployed from the opening bracket 100 (see FIG. 6).

Preferably, the mounting portion 210 is injection molded to extend from the protruding member 100a and rotates about one end portion thereof. Accordingly, when the mounting guide 200 rotates to be coupled to the opening bracket 100, the mounting portion 210 is placed to surround an upper surface of the protruding member 100a.

So as to enable the above action, the one end portion of the mounting portion 210 may have a notch structure 210a.

As the mounting portion 210 rotates, the locking portion 220 is placed in a locking groove H in the protruding member 100a.

To this end, the locking portion 220 has a hook shape, and as the mounting portion 210 rotates, the locking portion 220 is locked in the locking groove H to fix the mounting guide 200 in place, as illustrated in FIG. 4.

The seating portion 230 is integrated with the mounting portion 210 and the locking portion 220, and as the mounting portion 210 rotates, the seating portion 230 forms the seating area A while supporting the lighting module 300 placed on the protruding member 100a.

More preferably, the seating area A of the seating portion 230 is rounded to correspond to the shape of the lighting module 300 to thereby, when the mounting portion 210 rotates, support and fix the lighting module 300 placed on the protruding member 100a in the state of the locking portion 220 being locked in the locking groove H.

Figure 8:
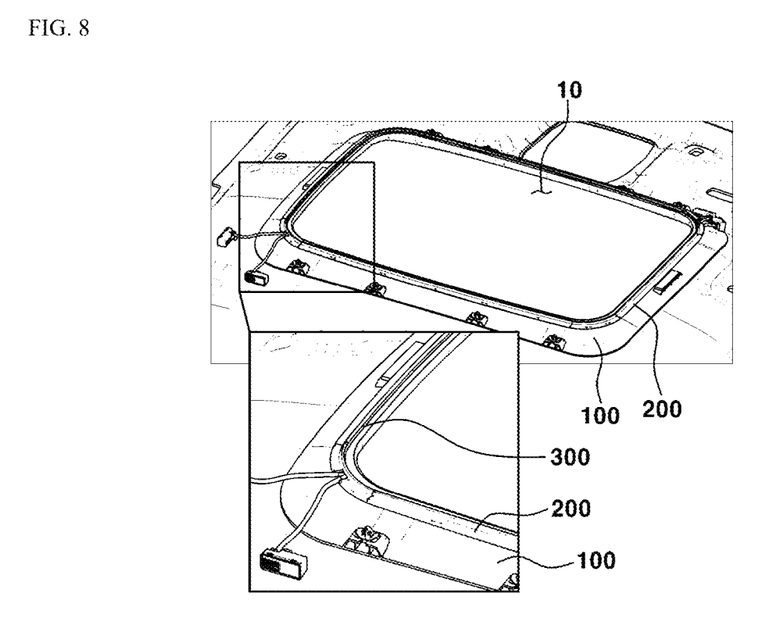

As described above, when the mounting guide 200 rotates to be coupled to the opening bracket 100, the mounting guide 200 may be integrally coupled to the opening bracket 100 owing to the injection molding structure. Here, the lighting module 300 may be fixed in place by being exposed to face the opening 10, as illustrated in FIG. 8.

Therefore, because the mounting guide 200 is integrally coupled to the opening bracket 100 by being divided into forward and rearward portions (forward and rearward are directions of operation of the sunroof system 2), opposite side portions, and corner portions, the mounting guide 200 may stably fix and support the lighting module 300 having a loop shape to allow light to be radiated toward a sunshade of the sunroof system in all directions, overcoming the limitation in applying a mood lamp in the prior art and improving marketability.

Meanwhile, as described above, in allowing light to be radiated toward the sunshade of the sunroof system in all directions, the length and pattern of a radiation path may be adjusted.

Figure 9:
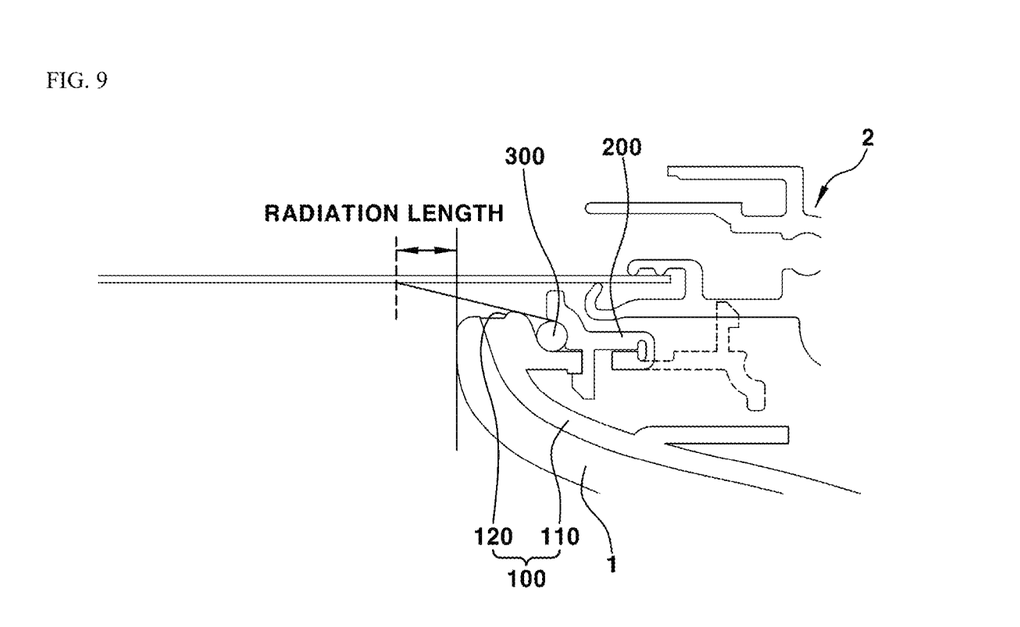
FIG. 9 is a view showing the radiation length and radiation pattern for an injection bracket device applied to a roof opening for a vehicle according to an embodiment of the present disclosure.

To this end, the opening bracket 100 may include, as illustrated in FIG. 9, a body portion 110 provided to be brought into contact with an inner side of the headlining 1, and a radiation path forming portion 120 integrated with the body portion 110 and configured to set the radiation path from the lighting module 300.

Here, the radiation path forming portion 120 may be injected to selectively protrude to be stepped with respect to the headlining 1, adjusting the length of the radiation path.

In other words, as illustrated in FIG. 9, the radiation path forming portion 120 protrudes to be stepped with respect to the headlining 1 to form a radiation path having a predetermined length toward the sunroof system. When the radiation path forming portion 120 is leveled with the headlining 1 as illustrated in FIG. 10, a radiation path longer than the radiation path in FIG. 9 may be formed.

More specifically, when the radiation path forming portion 120 protrudes to be stepped with respect to the headlining 1 (see FIG. 9), the radiation path forming portion 120 partially blocks the radiation path from the lighting module 300, forming a shorter radiation path. Conversely, when the radiation path forming portion 120 is leveled with the headlining 1 (see FIG. 10), the radiation path forming portion 120 does not block the radiation path from the lighting module 300, forming a longer radiation path.

Besides the above, as illustrated in FIG. 11A, the radiation path forming portion 120 may also be injected to be stepped with respect to the headlining 1 and alternately protrude in the length direction of the body portion 110, allowing the radiation path in all directions toward the sunshade of the sunroof system 2 to form a predetermined pattern.

For example, the radiation path forming portion 120 may repeatedly protrude to be stepped with respect to the headlining 1 at predetermined intervals, radiating light in a wave pattern to the sunshade of the sunroof system 2, as illustrated in FIG. 11B.

Meanwhile, the injection bracket device applied to a roof opening for a vehicle according to this embodiment may further include a shock-absorbing member 400, and the shock-absorbing member 400 may be, as illustrated in FIG. 12, integrally mounted to the opening bracket 100.

The shock-absorbing member 400 is installed to reduce the degree of injury caused by primary and secondary impacts to the passenger's head in the event of a frontal collision, side collision, and rollover accident of the vehicle, and is essential for evaluating the energy absorption for the vehicle interior. However, because it is not possible to mount the shock-absorbing member 400 to the opening bracket made of steel as in the prior art, the shock-absorbing member 400 must be attached separately, thereby increasing the number of work hours, weight, and material costs.

For this reason, in this embodiment, when injection molding the opening bracket 100, a plurality of mounting areas B configured to mount thereto the shock-absorbing member 400 is also injected together with the mounting guide 200, allowing the shock-absorbing member 400 to be easily mounted to the opening bracket 100.

For example, for easy mounting, the plurality of mounting areas B may have a structure in which the shock-absorbing member 400 is inserted to be mounted in a sliding manner, as illustrated in FIG. 13. However, the structure is merely one embodiment and is not limited thereto, so the structure for mounting the shock-absorbing member 400 may vary, such as, mounting the same in an insertion manner.

Meanwhile, the injection bracket device applied to a roof opening for a vehicle according to this embodiment may further include a position-fixation member 500. The position-fixation member 500 may be, as illustrated in FIG. 14, integrally injected to a coupling portion 102 of the opening bracket 100, fixing the sunroof system 2 in place in the opening 10.

In other words, the position-fixation member 500 may have, as illustrated in FIG. 15, a shape corresponding to that of a plurality of coupling protrusions 2a attached to the sunroof system 2 to thereby be inserted and locked crosswise between the coupling protrusions 2a.

Generally, the opening bracket 100 should be fixed in place with respect to the sunroof system 2 to radiate light to the sunroof system 2 through the lighting module 300 that is mounted on the opening bracket 100. Therefore, the sunroof system 2 and the opening bracket 100 are coupled to each other using the position-fixation member 500, allowing the opening bracket 100 to be easily fixed in place on the sunroof system 2.

The structure in which the coupling protrusion 2a and the position-fixation member 500, having a shape corresponding to that of the coupling protrusion 2a, are coupled to each other to fix the opening bracket 100 in place is merely one embodiment and is not limited thereto. The opening bracket 100 may also have a structure in which, as illustrated in FIG. 16 and FIG. 17, a plurality of position-fixation members 500' having a wedge shape is injected on the coupling portion 102. With this structure, the opening bracket 100 may be fixed in place on the sunroof system 2 by inserting the position-fixation members 500' into coupling holes 2b formed in the sunroof system 2.

As is apparent from the above description, the present disclosure provides the following effects.

According to the present disclosure, an opening bracket including a mounting guide is injection molded to mount a lighting module along the edge of a headliner opening, allowing lights to be uniformly radiated in all directions of a sunroof including corners, and setting the radiation length and radiation pattern of the light by modifying the structure of the opening bracket, thereby securing a degree of freedom regarding the radiation of lights.

Moreover, according to the present disclosure, the opening bracket, which was made of a steel material in the prior art, is injection molded and is mounted in the opening, reducing weight, improving fuel efficiency (or battery efficiency) and reducing material costs to thereby increase the profitability of the vehicle.

In the above, embodiment(s) of the present disclosure have been described with reference to the accompanying drawings. However, those skilled in the art to which the present disclosure pertains will understand that various modifications may be made therefrom, and that all or part of the above-described embodiment(s) may be selectively combined. Therefore, the true technical protection scope of the present disclosure should be determined by the technical ideas of the appended claims.

What is claimed is:

1. A bracket device applied to a roof opening for a vehicle, the bracket device comprising:
   an opening bracket mounted to an opening formed in a headlining of the vehicle; and
   a mounting guide provided along an edge of the opening bracket,
   wherein the mounting guide is divided into forward and rearward portions, opposite side portions, and corner portions, facilitating each portion to be coupled to the opening bracket by rotation,
   wherein the mounting guide forms a seating area when being coupled to the opening bracket.

2. The bracket device of claim 1, further comprising a lighting module placed on the seating area.

3. The bracket device of claim 1, wherein the mounting guide is integrally formed to be deployed outward from the edge of the opening bracket.

4. The bracket device of claim 1, wherein the mounting guide is divided into plural portions and constitutes one body.

5. The bracket device of claim 2, wherein the opening bracket comprises:
   a body portion provided to be brought into contact with an inner side of the headlining; and a radiation path forming portion, forming the seating area together with the mounting guide on the body portion and configured to set a radiation path of the lighting module.

6. The bracket device of claim 5, wherein the radiation path forming portion is formed to protrude to be stepped with respect to the headlining to thereby adjust a length of the radiation path.

7. The bracket device of claim 5, wherein the radiation path forming portion is formed to be stepped with respect to the headlining and alternately protrude in a length direction of the body portion to thereby form a pattern of the radiation path.

8. The bracket device of claim 2, wherein the mounting guide comprises:
- a mounting portion configured to rotate inward from a state deployed from the opening bracket;
- a locking portion to be placed to be locked in a locking groove in a protruding member provided on the opening bracket, as the mounting portion rotates; and
- a seating portion to form the seating area while supporting the lighting module placed on the protruding member, as the mounting portion rotates.

9. The bracket device of claim 8, wherein the mounting portion includes a notch structure configured to allow the mounting portion to rotate about one end portion extending from the protruding member.

10. The bracket device of claim 8, wherein the seating portion is rounded to correspond to a shape of the lighting module.

11. The bracket device of claim 1, further comprising a shock-absorbing member inserted to be integrally mounted in a plurality of mounting areas formed on the opening bracket.

12. The bracket device of claim 1, further comprising a position-fixation member integrally injection molded on the opening bracket to fix a sunroof system in place in the opening.

13. The bracket device of claim 12, wherein the position-fixation member has a shape corresponding to that of a plurality of coupling protrusions attached to the sunroof system to thereby be inserted and locked crosswise between the coupling protrusions.

14. The bracket device of claim 12, wherein the position-fixation member protrudes in a wedge shape to thereby be inserted and locked in a plurality of coupling holes formed in the sunroof system.

* * * * *